United States Patent [19]

Mehta et al.

[11] Patent Number: 5,648,143
[45] Date of Patent: Jul. 15, 1997

[54] HEAT RESISTANT ADHESIVES FOR ADHERING MAILER WINDOWS

[75] Inventors: Rajendra Mehta; Walt Akridge, both of Dayton, Ohio

[73] Assignee: The Standard Register Company, Dayton, Ohio

[21] Appl. No.: 783,533

[22] Filed: Oct. 28, 1991

[51] Int. Cl.$^6$ .................................................. B65D 27/04
[52] U.S. Cl. .............................. 428/137; 229/69; 229/71; 229/80; 229/92.3; 229/92.5; 229/303; 229/304; 428/138; 428/194; 428/195; 428/507; 428/511; 525/330.5; 525/360.6; 525/375; 525/378
[58] Field of Search ................................ 428/137, 138, 428/194, 195, 345, 355; 525/143, 163, 371, 375, 378, 330.5, 330.6; 229/71, 92.3, 92.5, 69, 303, 304, 80; 522/107

[56] References Cited

U.S. PATENT DOCUMENTS

| | | | |
|---|---|---|---|
| 2,158,233 | 5/1939 | Gray | 229/71 |
| 4,081,127 | 3/1978 | Steidinger | 229/69 |
| 4,277,529 | 7/1981 | Friedman | 428/511 |
| 4,510,274 | 4/1985 | Okazaki et al. | 523/411 |
| 4,729,506 | 3/1988 | Neubauer | 229/71 |
| 4,754,915 | 7/1988 | Steidinger | 229/92.7 |
| 4,784,317 | 11/1988 | Chen et al. | 229/92.3 |
| 4,889,278 | 12/1989 | Steidinger | 229/92.1 |
| 4,898,323 | 2/1990 | Chen et al. | 229/92.3 |
| 4,944,449 | 7/1990 | Schmidt | 229/73 |
| 4,944,450 | 7/1990 | Schmidt | 229/73 |
| 4,951,864 | 8/1990 | Dicker | 229/80 |
| 4,999,334 | 3/1991 | Mehta | 503/226 |
| 5,002,976 | 3/1991 | McConnell | 522/107 |
| 5,102,737 | 4/1992 | Josephy | 428/195 |
| 5,128,387 | 7/1992 | Shustack | 522/92 |

FOREIGN PATENT DOCUMENTS 172939  10/1982  Japan.

*Primary Examiner*—Nasser Ahmad
*Attorney, Agent, or Firm*—Killworth, Gottman, Hagan & Schaeff, L.L.P.

[57] ABSTRACT

A window-containing mailer is provided which is suitable for use in nonimpact printers using heated fuser rolls. A heat and moisture resistant adhesive which resists picking at temperatures encountered in the fusing rolls secures a transparent polymeric film or glassine patch to the mailer substrate. The adhesive may be either a crosslinkable aqueous-based latex or emulsion or a radiation curable composition.

3 Claims, 2 Drawing Sheets

5,648,143

HEAT RESISTANT ADHESIVES FOR ADHERING MAILER WINDOWS

BACKGROUND OF THE INVENTION

This invention relates to mailers and mailer window patches adhered thereto which resist delamination and picking at temperatures encountered in fuser rolls of laser printers, and in particular, to the use of heat and moisture resistant adhesives for adhering transparent mailer windows to mailer substrates.

Nonimpact printers are finding increasing use and acceptance in a variety of businesses. In particular, the use of nonimpact printers, such as laser printers, for the printing of labels, business forms, and mailers is growing rapidly. Such printers operate by turning on and off a computer-controlled laser beam of light in a specific pattern onto an image cylinder or drum to form a latent image of positive and negative static charges.

As the image cylinder is rotated, toner particles from a toner cartridge are deposited on the image areas on the cylinder and held there by the static charges. As the image cylinder continues to rotate, the now visible toner image on the cylinder is then transferred to paper which has been statically charged to attract the toner particles and has the correct level of conductivity required. A corona wire positioned adjacent the image cylinder then erases the cylinder so that a new cycle may begin.

Typically, the toner image on the paper is then fused by passing the paper through a pair of rolls which apply both heat and pressure to the paper. This fusing of the thermoplastic binder which accompanies the toner by the application of heat and pressure is designed to bond the toner particles permanently to the paper. Fusing temperatures of from 400° to about 450° F. may be encountered by the paper in the fusing rolls.

One disadvantage of using nonimpact printing devices such as laser printers has been the difficulty of printing variable information on envelopes or mailers. Previously, when prior art natural dry gum or hot melt adhesives heretofore found on the flaps of envelopes or on the marginal portions of mailers encountered the high temperatures in the fusing rolls of such printers, the adhesives would soften, become tacky, and then adhere to both the fuser rolls and prematurely to the paper substrate of the envelope or mailer. Obviously, such a result was unacceptable as it damaged both the printer and the envelope or mailer.

There have been several attempts in the art to solve this problem. For example, Steidinger, U.S. Pat. Nos. 4,754,915 and 4,889,278, teaches the application of glue or adhesive to a mailer construction after printing in a laser printer, or alternatively, applying glue or adhesive in a manner such that the glue or adhesive is covered and protected by another portion of the mailer so that it does not directly encounter the fuser rolls of a laser printer.

Chen et al, U.S. Pat. Nos. 4,784,317 and 4,898,323, teach the application of a heat resistant, water or moisture activated adhesive to the marginal portions of a mailer to avoid adhesive activation problems in the fuser rolls of a laser printer. Alternatively, Chen et al teach the application of a pressure sensitive adhesive and then covering the adhesive with a protective release liner for passage through a laser printer.

Schmidt, U.S. Pat. Nos. 4,944,449 and 4,944,450, teach the application of a remoistenable adhesive along certain marginal portions of a mailer construction after the construction has been printed in a laser printer. Dicker, U.S. Pat. No. 4,951,864, teaches the application of a water activatable, heat resistant adhesive to the marginal edges of a mailer construction which is imaged in a laser printer.

None of the prior art, however, addresses the distinct problem of printing window-containing mailers which include a transparent polymeric or glassine patch overlying a die-cut opening in the mailer, imaged in nonimpact printers such as laser printers. Use of conventional natural dry gum or hot melt adhesives to secure the window patches results in softening of the adhesives in the fuser rolls, causing delamination of the windows (known in the art as "picking"). Transfer of the adhesive onto the fuser rolls may also occur. Additionally, there may be a build up of static charges on such fuser rolls which then have an affinity for many polymeric films and exacerbate the picking problem.

While it may be possible to print the inside of a mailer prior to attaching a transparent window patch thereto, such is impractical. Users of mailers need to be able to print variable information on the mailer. Equipment with the capability to place an adhesive bead around a die cut area accurately and then apply a transparent patch is typically too complex and expensive for such users.

The use of transparent polymeric films as window patches has increased because the automated sorting equipment used by the U.S. Postal Service can accurately scan through such polymers more readily than glassine. However, because of the essentially nonporous nature of such polymeric films, conventional adhesives heretofore used do not adhere well to polymeric surfaces. The adherence problem is compounded where the bond between window patch and mailer substrate is subjected to the elevated temperatures encountered in the fuser rolls of laser printers.

Accordingly, the need still exists in the art for envelopes and mailers having transparent window patches therein which resist picking at temperatures encountered in the fuser rolls of laser printers, and for a heat and moisture resistant adhesive which provide strong bonds between a window patch and mailer or envelope substrate.

SUMMARY OF THE INVENTION

The present invention meets that need by providing a heat resistant adhesive which provides a strong bond between a transparent polymeric film or glassine window and a cellulosic substrate such as an envelope or mailer and which resists picking at temperatures encountered in the fusing rolls of a nonimpact printer. The adhesive may be either a crosslinkable aqueous-based latex or emulsion or a radiation curable composition.

In accordance with one aspect of the present invention, a transparent polymeric film or glassine window-containing mailer or envelope for use in a nonimpact printer having heated fuser rolls is provided. By transparent, we means sufficiently transmissive of light to enable information beneath to be read, either by a human or automated optical scanning equipment. The heat and moisture resistant adhesive composition of the present invention bonds the transparent polymeric film or glassine window to the mailer or envelope, with the adhesive providing a bond sufficient to prevent dislodging or "picking" of the window from the mailer or envelope at temperatures from ambient to about 450° F.

In one embodiment of the invention, the adhesive composition comprises a crosslinked, carboxylated copolymer of ethylene and vinyl acetate which is applied to the mailer or envelope substrate as an aqueous-based latex or emulsion containing approximately 40–60% solids. The carboxyl groups on the copolymer provide crosslinking sites which provide the adhesive with its heat resistance and resistance to softening at high temperatures.

To crosslink the adhesive, the composition also includes a crosslinking agent which is a thermosetting resin selected from the group consisting of phenol formaldehyde adducts and phenol melamine formaldehydes. Examples of suitable crosslinking agents include phenolic resoles and trimethylphenol melamine formaldehydes such as hexamethoxymethyl melamine. Alternatively, the crosslinking agent may be selected from the group consisting of water soluble zirconium salts such as ammonium zirconium carbonate and emulsified epoxy resins.

In an alternative embodiment of the invention, the adhesive composition comprises a radiation cured adhesive which is formed from a blend of acrylate monomers and oligomers. Either an electron beam or ultraviolet radiation may be used to cure the adhesive. Where ultraviolet radiation is used, the composition also includes a photocatalyst. The blend of acrylate monomers and oligomers preferably includes an isobornyl acrylate monomer which increases the adhesive qualities of the composition and a multifunctional polyester acrylate. The adhesive composition also optionally may include vinyl pyrrolidone.

We have found that the adhesives of the present invention not only are heat and moisture resistant, but also provide a strong bond between the transparent polymeric film or glassine windows and the mailer or envelope substrate. Windows attached using the adhesives of the present invention resist "picking" in the fuser rolls of nonimpact printers such as laser printers.

Accordingly, it is an object of the present invention to provide a heat resistant adhesive which resists softening and degradation at temperatures encountered in the fusing rolls of a nonimpact printer and which provides a strong bond between a transparent polymeric film or glassine window and a cellulosic substrate such as an envelope or mailer. This, and other objects and advantages of the present invention will become apparent from the following detailed description, the accompanying drawings, and the appended claims.

BRIEF DESCRIPTION OF THE DRAWINGS

FIG. 1 is an elevational view of the front side of a mailer substrate containing a window portion and which is adapted to be printed in a laser printer or the like;

DETAILED DESCRIPTION OF THE PREFERRED EMBODIMENT

Figure 1:
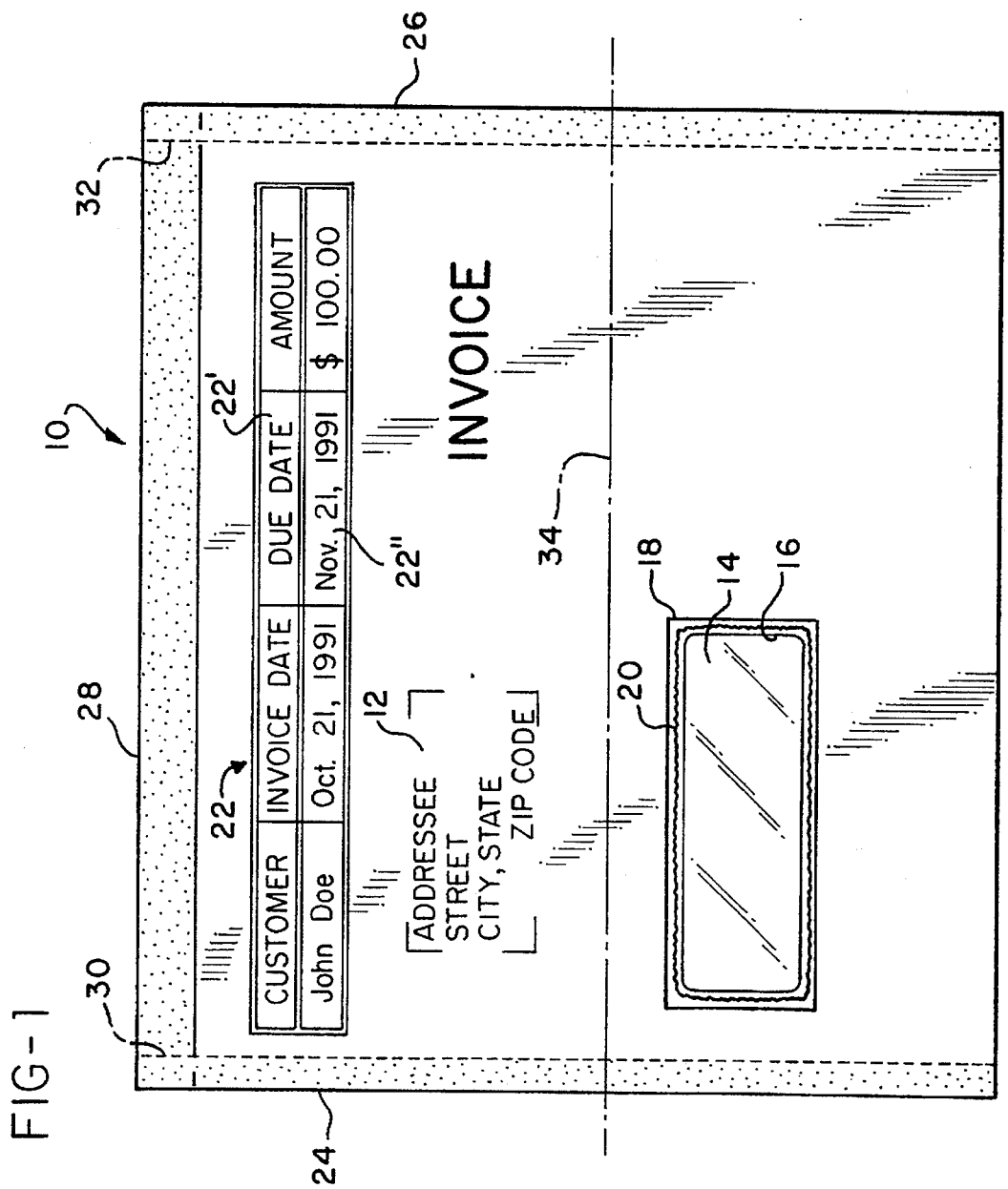
Figure 3:
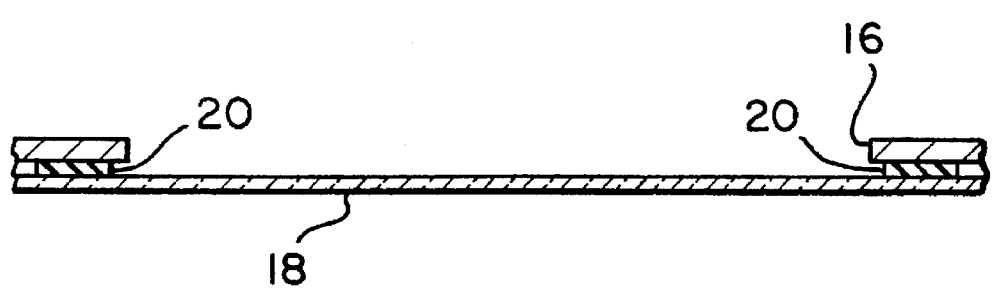
FIG. 3 is a cross section of a portion of the mailer of FIG. 2 taken along line 3—3 in FIG. 2.

Referring now to the drawings, FIG. 1 shows a one-piece mailer 10 for use with nonimpact printers such as laser printers. The mailer 10, which is depicted in an open configuration with the interior surfaces shown, includes an area or box 12 for printing addressee information which, when the mailer is folded and glued, appears in window 14. Window 14 is formed from a die cut area 16 on the mailer substrate. A transparent polymeric or glassine patch 18 covers the die cut area 16 to form the window. The transparent patch is secured in place through the use of a peripheral bead 20 of the heat and moisture resistant adhesive of the present invention. Preferably, adhesive bead 20 is positioned interiorly of the die cut edge as well as of the edges of the transparent patch, as is best shown in FIG. 3.

Mailer 10 also includes an area 22 which contains both preprinted information 22' and variable information 22", the variable information being printed by the laser printer. Either before or after laser printing, the marginal edges 24 and 26 of mailer 10, as well as flap 28, are coated with a suitable adhesive. Where the adhesive is applied prior to printing in the laser printer, the adhesive preferably is heat resistant. At least the adhesive along flap 28 is water remoistenable.

Mailer 10 may be prepared as follows. The mailer, typically in the form of a continuous web, may be preprinted with nonvariable information 22' by conventional printing processes such as offset lithography. Perforation lines 30, 32 are formed. At this time, the window is also formed by die cutting area 16, applying a peripheral bead of the heat and moisture resistant adhesive of the present invention 20, and then applying a transparent patch 18 to the window area.

Figure 2:
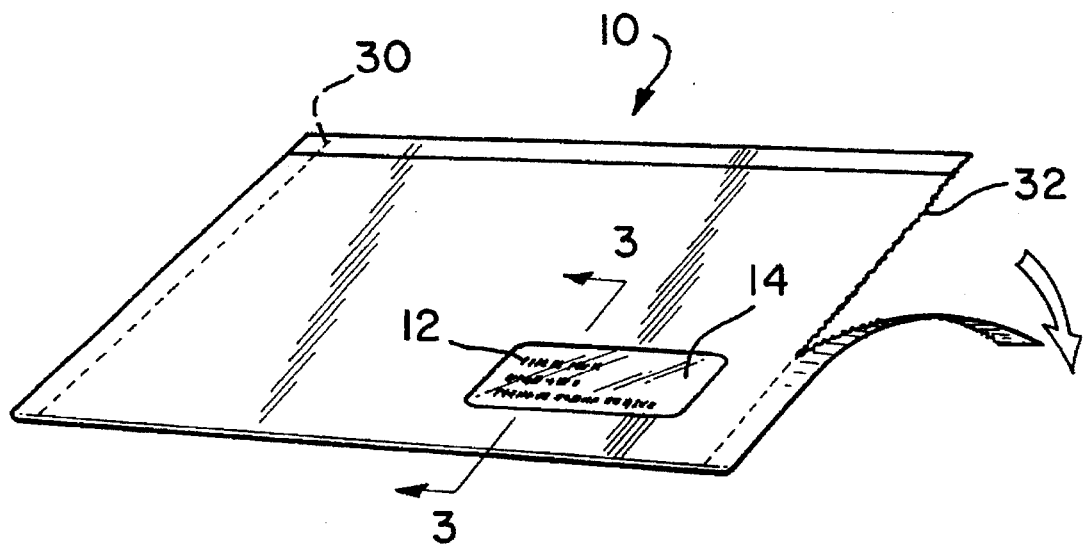
FIG. 2 is a perspective view of an assembled window-containing mailer.

The open configuration mailer is then sent to an end user and placed in a laser printer, either in the form of a continuous perforated sheet, or as a stack of single sheets. The end user may then print variable information 22" such as customer information, invoice date, due date, and amount due. The mailer form is then passed through folder/gluer equipment, adhesive applied to the marginal edges 24, 26 (and to flap 28 if adhesive has not already been previously applied there), and the mailer folded along fold line 34 and sealed, as is conventional in the art into the configuration illustrated in FIG. 2. Upon receipt, the recipient may open mailer 10 by tearing along perforations 30 and 32 to reveal the information printed in the interior thereof.

Where the water-based adhesive embodiment of the invention is utilized, the adhesive will crosslink and dry at room temperature without the need for heating. Where the radiation curable embodiment of the invention is used, the mailer passes through an area where it is exposed either to an electron beam or ultraviolet light to cure the adhesive. Preferably, the patch material is sufficiently transparent to ultraviolet or electron beam radiation to permit sufficient radiant energy to reach the adhesive to cure it.

While mailer 10 has been illustrated in the manner described above, it will be apparent to those skilled in the art that mailer 10 can take the form of any conventional configuration which makes use of one or more transparent window patches. The invention may also be used for window envelopes which are designed to be passed through heated fuser rolls in a printing operation. The adhesives of the present invention provide a strong, durable bond so that the window patches will not release from the mailer substrate during processing through the heated user rolls of a laser printer.

We have developed adhesives which are both heat and moisture resistant as well as providing strong bonding between paper and the window patch materials. Suitable window materials include glassine, or transparent polymers which are sufficiently heat resistant to withstand passage through the fuser rolls of a laser printer. Examples of suitable polymers include polyesters, polyvinyl fluoride, polyvinylidene fluoride, polyamides, polyimides, polycarbonates, polyethylene terephthalates, polyetherimides, and polysulfones. A preferred polymer for use in the practice of the present invention is a polyester designated as Mylar JXM 102 (trademark) available from E.I. du Pont de Nemours Co.

The adhesives of the present invention may be either water-based, or curable by radiation. In the embodiment of the invention which uses a water-based adhesive, the adhesive composition comprises a crosslinkable carboxylated copolymer of ethylene and vinyl acetate which is applied to the mailer or envelope substrate as an aqueous-based latex or emulsion containing approximately 40-60% solids. The carboxyl groups on the copolymer provide crosslinking sites which provide the adhesive with its heat resistance and resistance to softening at high temperatures. The copolymer is present in the composition in an amount of from between about 99.5 to 50% by weight.

The water-based adhesive composition also preferably includes a crosslinking agent which is a thermosetting resin selected from the group consisting of phenol formaldehyde adducts and phenol melamine formaldehydes. Examples of suitable crosslinking agents include phenolic resoles and trimethylphenol melamine formaldehydes such as hexamethoxymethyl melamine. The crosslinking agent may be present in the adhesive composition in an amount of from between about 0 to about 15 parts by weight.

Alternatively, the crosslinking agent may be selected from the group consisting of water soluble zirconium salts such as ammonium zirconium carbonate and emulsified epoxy resins. These crosslinking agents are preferably present in the adhesive composition in an amount of from between about 0 to 3.0 parts by weight. Thus, a preferred water-based adhesive for use in the present invention includes from about 99.5 to 50 parts by weight of a crosslinkable copolymer of ethylene and vinyl acetate and from about 0 to 15 parts by weight of a crosslinking agent, all parts based on a total of 100 parts for the composition.

In the embodiment of the invention which utilizes a radiation cure, the adhesive composition comprises a radiation curable adhesive which is formed from a blend of acrylate monomers and oligomers. Where ultraviolet radiation is used, the composition also includes a photocatalyst. The 100% solids composition contains no water; no drying step is required. The blend of acrylate monomers and oligomers preferably includes an isobornyl acrylate monomer which increases the adhesive qualities of the composition and a multifunctional polyester acrylate. The adhesive composition also optionally may include vinyl pyrrolidone.

In a preferred composition, the adhesive comprises from about 25 to about 35 parts by weight of an isobornyl acrylate, from about 45 to about 55 parts by weight of a polyester acrylate monomer, from about 8 to 12 parts by weight of an acrylate oligomer, and from about 0 to 8 parts by weight of a photocatalyst. Optionally, up to about 10 parts by weight vinyl pyrrolidone may also be added to the composition. All parts are based on a total of 100 parts for the composition.

In order that the invention may be more readily understood, reference is made to the following examples, which are intended to be illustrative of the invention, but are not intended to be limiting in scope.

EXAMPLE 1

Water-based adhesive compositions for use in bonding a transparent polyester or glassine patch to a mailer substrate were prepared by blending as follows:

Composition #1: 99.0 parts by weight of a 54.45% solids latex of a carboxylated copolymer of ethylene and vinyl acetate (Elvace 40722-00 from Reichold Chemical or Airflex 426 from Air Products) with 1.0 part by weight hexamethoxymethyl melamine (Cymel 303, available from American Cyanamid).

Composition #2: 83.52 parts by weight of a 45.93% solids latex of a carboxylated copolymer of ethylene and vinyl acetate with 16.48 parts by weight hexamethoxymethyl melamine (Cymel 303, available from American Cyanamid).

Composition #3: 98.7 parts by weight of a 54.28% solids latex of a carboxylated copolymer of ethylene and vinyl acetate with 1.0 part by weight hexamethoxymethyl melamine (Cymel 303, available from American Cyanamid) and 0.3 parts by weight methanol.

Composition #4: 99.5 parts by weight of a 54.72% solids latex of a carboxylated copolymer of ethylene and vinyl acetate with 0.5 parts by weight of a 20% solution of ammonium zirconium carbonate.

EXAMPLE 2

Radiation curable, 100% solids adhesive compositions for use in bonding a transparent polyester or glassine patch to a mailer substrate were prepared by blending as follows:

Composition #5: 31.25 parts by weight of isobornyl acrylate monomer (IBOA from Radcure), 52.08 parts by weight of a polyester acrylate monomer (3255 from Huls Chemical), 10.41 parts by weight of an acrylate oligomer (Ibecryl 170 from Radcure), and 6.25 parts by weight of 1-hydroxycyclohexylphenyl ketone photocatalyst (available from Ciba Geigy).

Composition #6: 28.30 parts by weight of isobornyl acrylate monomer (IBOA from Radcure), 47.16 parts by weight of a polyester acrylate monomer (3255 from Huls Chemical), 9.43 parts by weight of an acrylate oligomer (Ibecryl 170 from Radcure), 5.66 parts by weight of 1-hydroxycyclohexylphenyl ketone photocatalyst (available from Ciba Geigy), and 9.43 parts by weight vinyl pyrrolidone.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A mailer or envelope for use in a nonimpact printer having heated fuser rolls, said mailer or envelope containing a window of a transparent polymeric film or glassine which is bonded to said mailer or envelope by a heat and moisture resistant adhesive composition comprising an aqueous-based latex or emulsion of a carboxylated copolymer of ethylene and vinyl acetate, which has been crosslinked by a crosslinking agent selected from the group consisting of phenol formaldehyde adducts, phenol melamine formaldehydes, and water soluble zirconium salts, said adhesive composition providing a bond sufficient to prevent dislodging of said window from said mailer or envelope at temperatures from ambient to about 450° F.

2. The adhesive composition of claim 1 in which said crosslinking agent comprises hexamethoxymethyl melamine.

3. The adhesive composition of claim 1 in which said crosslinking agent comprises ammonium zirconium carbonate.

* * * * *